United States Patent [19]

Anderson

[11] Patent Number: 5,310,025

[45] Date of Patent: May 10, 1994

[54] AIRCRAFT BRAKE VIBRATION DAMPER

[75] Inventor: Bruce W. Anderson, Niles, Mich.

[73] Assignee: Allied-Signal Inc., Morristown, N.J.

[21] Appl. No.: 918,994

[22] Filed: Jul. 23, 1992

[51] Int. Cl.$^5$ .............. F16D 3/14; F16D 13/68; F16D 65/02

[52] U.S. Cl. .............. 188/73.37; 192/70.17

[58] Field of Search ........... 188/73.37, 73.36, 218 A, 188/71.5, 18 A; 192/30 V, 70.17, 70.2; 301/6.2, 6.8

[56] References Cited

U.S. PATENT DOCUMENTS

| | | | |
|---|---|---|---|
| 3,754,624 | 8/1973 | Eldred | 188/71.5 |
| 3,892,293 | 7/1975 | Dowell | 188/71.5 |
| 3,958,833 | 5/1976 | Stanton | 188/71.5 X |
| 4,084,857 | 4/1978 | Veen | 301/6.2 |
| 4,154,322 | 5/1979 | Yamamoto et al. | 188/73.37 |
| 4,576,255 | 3/1986 | Méry | 188/71.5 |
| 4,856,619 | 8/1989 | Petersen | 188/71.6 X |
| 5,199,536 | 4/1993 | Clark | 301/6.2 X |

FOREIGN PATENT DOCUMENTS

| | | |
|---|---|---|
| 0130883 | 1/1985 | European Pat. Off. . |
| 2546250 | 11/1984 | France . |
| 1350350 | 4/1974 | United Kingdom . |
| 1587940 | 4/1981 | United Kingdom . |
| 2201475 | 9/1988 | United Kingdom . |

OTHER PUBLICATIONS

Allied-Signal 767-300 Carbon Brake Service Bulletin No. 2608812-32-009 dated May 26, 1989.
Part No. 2610398 drawing (2 pages) Mar.-Apr., 1989.
Allied-Signal 767 Carbon Brake Service Bulletin No. 2608812-32-012 dated Jun. 1, 1990.

*Primary Examiner*—Robert J. Oberleitner
*Assistant Examiner*—Alfred Muratori
*Attorney, Agent, or Firm*—Larry J. Palguta; McCormick. Leo H.; Robert A. Walsh

[57] ABSTRACT

The aircraft brake vibration damper (30, 60) comprises a mesh material (30, 60) located at axially extending spaced-apart side walls (22) of a spline (12) of a torque tube (10) so that the mesh material (30, 60) is located between the spline (12) and a metal cover cap (20, 50) for the spline (12). The mesh material (60) can extend about the torque tube (10) and splines (12) and completely over a top surface (17) of each spline (12). The mesh material (80) can be located in a cavity (75) of heat shield segments (70) located between the splines (12). The mesh material (30, 60, 80) may be a knit or woven damping material (30, 60, 80) that dampens vibrations during brake operation.

12 Claims, 2 Drawing Sheets

AIRCRAFT BRAKE VIBRATION DAMPER

The present invention relates generally to an aircraft brake, and in particular to a vibration damper for an aircraft brake with carbon-carbon composite discs.

Aircraft disc brakes can exhibit severe vibration characteristics due to various self-excitation mechanisms. One class of vibration modes, commonly described as "squeal", results in a torsional windup of the stationary parts of the brake. While the modes are of a distributive spring-mass system nature, the elements include stationary carbon-carbon composite friction discs (stators, pressure plate, backing plate), torque tube, piston actuator, and other components. The stationary friction discs might be idealized as lumped angular inertia elements coupled to torque tube spline interfaces with equivalent disc elastic and damping elements. The torque tube and other structural elements might be typically idealized by additional angular inertia, spring and damping elements. Squeal vibration occurs when velocity dependent brake torques result in "negative damping" and the negative damping exceeds the effective positive damping in the distributive system. Negative damping is usually associated with the partial derivative of the brake torque with respect to slip velocity ("negative slopes"). U.S. Pat. No. 5,143,184 discloses damping mechanisms located within the carbon-carbon composite brake discs. Because of the higher temperatures associated with the use of carbon discs in aircraft brakes, heat shields are typically attached to the outer diameter or to the inner diameter, or to both, of a torque tube. Unfortunately, simple sheet heat shields are lightly damped. The brake squeal modes will tend to excite the high frequency modes of heat shields and result in cracking, chipping, etc. due to fatigue. These failed heat shield elements may then migrate or find their way into the area between the torque tube splines and the inner diameter slots of the stators and cause damage to the carbon-carbon composite stators. It is highly desirable to provide a mechanism for implementing positive damping between the carbon-carbon composite friction discs and the splines of the torque tube. Because of the high temperatures experienced in this region, the damping mechanism must be able to operate in the range of up to 1000° F. for normal braking surface, and in the range of approximately 2000° F. for emergency or rejected take-off temperatures.

The present invention provides solutions to the above problems by providing in an aircraft brake having rotatable discs connected with a wheel and stationary discs connected with a torque tube, the stationary discs having at an inner diameter thereof a plurality of circumferentially spaced-apart complementary shaped axial openings which receive respectively axially extending splines of the torque tube, the axially extending splines each having a pair of substantially radially extending circumferentially spaced-apart walls extending along the axial length of the spline and connected by a circumferentially extending radially outer surface of the spline, a vibration dampening mesh material located adjacent each of the spaced-apart walls, and a metal cover extending axially and disposed over each of said splines so that the mesh material is located between the respective spline and metal cover which is located within the complementary shaped axial openings of the stationary discs, so that during operation of said brake the mesh material effects a dampening of vibrations generated during braking operation.

The invention is described in detail below with reference to the drawings which illustrate embodiments in which.

Figure 1:
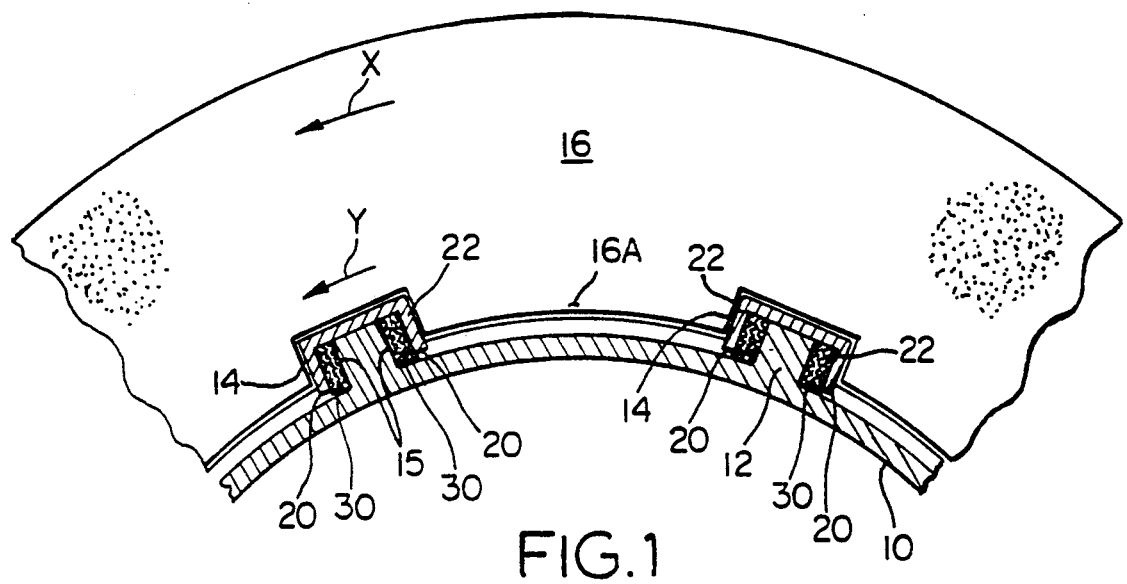
FIG. 1 is a partial sectional view of an aircraft brake torque tube and a carbon-carbon composite brake disc coupled therewith.
Figure 2:
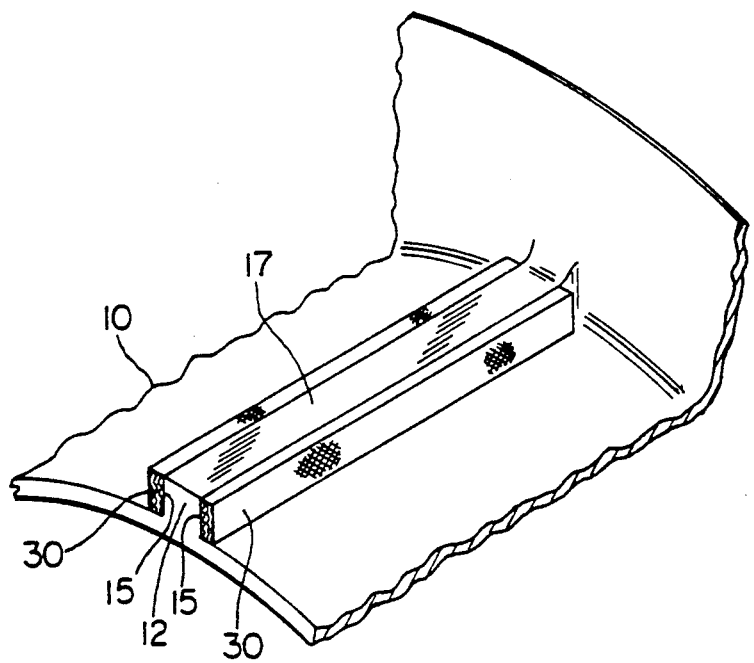
FIG. 2 is an isometric view of the torque tube with the present invention located along a spline.

Referring to FIG. 1, a portion of an aircraft brake is illustrated wherein torque tube 10 includes thereabout a plurality of circumferentially spaced-apart, axially extending splines 12 which are located within circumferentially spaced-apart, axially extending and complementary openings 14 in carbon-carbon composite brake disc or stator 16. The radially inner areas of stator 16 are stator lugs 16A. As illustrated in FIG. 2, each spline 12 extends axially along torque tube 10 to provide axially extending and radially outer surface 17 and a pair of circumferentially spaced apart, axially extending spaced-apart walls 15. Stator 16 is coupled with splines 12 by means of a plurality of metal drive keys or spline caps 20 which extend axially along most of the length of splines 12 and are shaped complementary with splines 12 and slots 14. Spline caps 20 are connected to splines 12 by means such as screws, as is well known in the art, or may be connected by way of retention members as disclosed in U.S. Pat. No. 5,186,521. Slots 14 receive metal caps 20 and located between each metal cap 20 and a respective wall 15 is a vibration damper 30. Vibration dampers 30 comprise axially extending dampers which are located between sidewalls 22 of metal caps 20 and walls 15 of splines 12. Vibration dampers 30 may comprise mesh, knit, or woven damping materials which are able to withstand the high temperatures and loads experienced during normal and emergency braking procedures and which will provide sufficient damping of brake squeal (stators 16 being a part thereof) during braking operation. One such material that has been shown to be suitable for such a high temperature atmosphere and which effects damping of vibrations during braking operation, is a stainless steel wire mesh provided by Metex Technical Products Division of Metex Corporation and identified as Metex part number DEV1-7540 which is a four-strand 0.0045 inch type 304 stainless steel wire. Testing has shown that the steel mesh effects a substantial reduction in brake squeal except at exceedingly high frequencies in the range of approximately 8-9 kHz. The squeal levels have been controlled to the point that there is no damage to the carbon-carbon composite stator discs.

Figure 3:
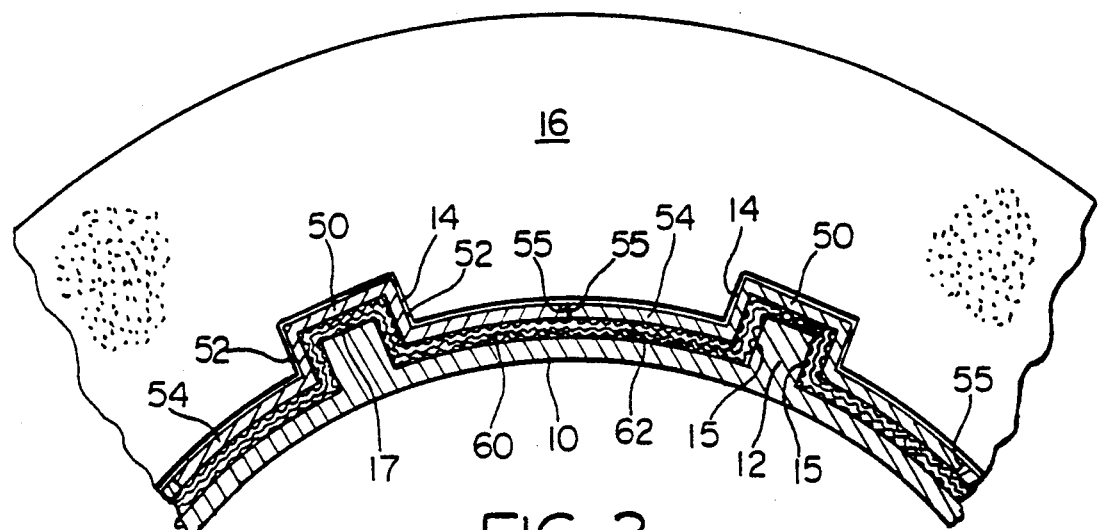
FIG. 3 is a second embodiment of the present invention.

In order to prevent the remaining vibration from effecting fatigue damage to the torque tube heat shield, the mesh material may be incorporated in the heat shield design and thus resolve damage thereto. In FIG. 3, each metal cap or heat shield jacket 50 includes radially extending and circumferentially spaced-apart sides 52 which also extend axially along walls 15 of splines 12. Shield segments 50 include circumferentially extending sides 54 each of which abut an adjacent side 54 at ends 55. Vibration mesh 60 is a substantially continuous mesh which extends over walls 15 and outer surface 17 of each spline 12 and extends between splines 12. Thus, a single piece of vibration damping mesh 60 may be placed over and about the circumference of torque tube 10 with opposite ends of mesh 60 abutting at juncture 62. In FIG. 3, vibration damping mesh 60 is trapped or captured between the substantially continuous metal caps 50 and torque tube 10. Vibration dampers 30 and 60 may take the form of metal knit or woven materials or metal fiber elements of various densities where the metal fibers are partially welded into a geometric form. These materials can provide positive damping when disc 16 (see FIG. 1) compresses the vibration material in the circumferential direction indicated by Arrow Y in FIG. 1. As the friction torque indicated by Arrow X in FIG. 1 loads stator lugs 16A against metal caps 20 and splines 12, the load is transmitted through vibration dampers 30. Friction between the metal fibers of dampers 30 results in positive Coulomb damping. In FIG. 3, radial vibration of metal cap sides 54 may also be reduced by cyclic compression of mesh 60 in the radial direction.

Figure 4:
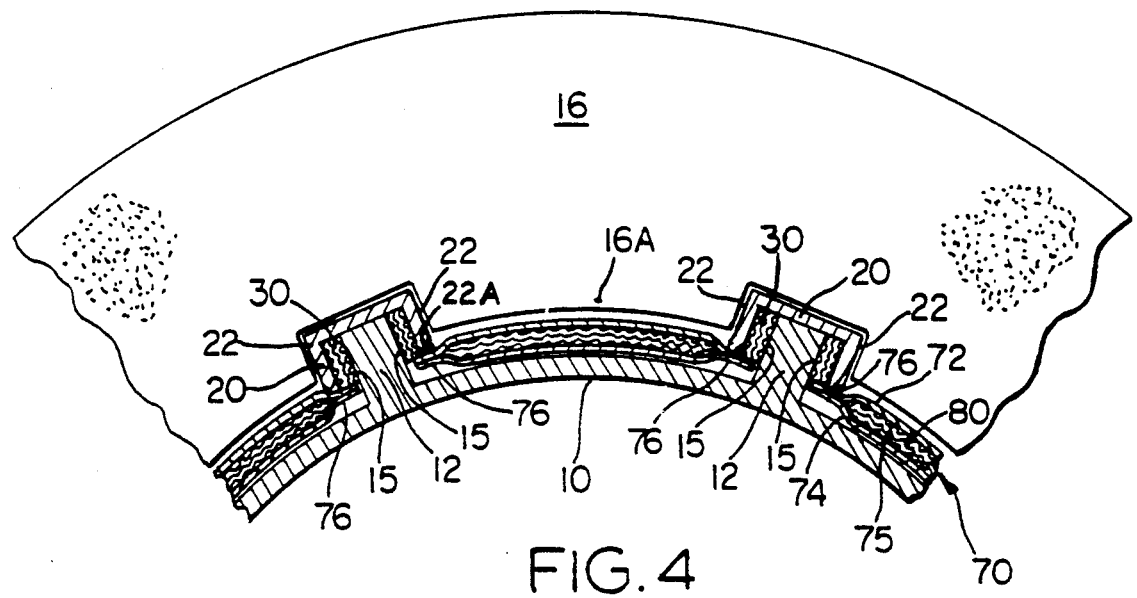
FIG. 4 is a third embodiment of the present invention.

FIG. 4 illustrates a third embodiment of the present invention wherein metal spline caps 20 are located over splines 12 with vibration dampers 30 located between each sidewall 22 of metal cap 20 and respective wall 15 of spline 12. Each heat shield segment 70 comprises an upper or radially outer member 72 and a lower or radially inner member 74 which meet at heat shield end 76 to define between members 72, 74 a cavity 75. Located within cavity 75 is vibration damper or mesh 80 which comprises the same mesh, knit, or woven damping material disclosed above. Each end 76 of heat shield segment 70 extends circumferentially under a radial end 22A of sidewall 22 of metal spline cap 20, so that caps 20 hold radially in place heat shield segments 70. Vibration dampers or mesh 30 effects the positive Coulomb damping as disclosed above, while vibration dampers or mesh 80 effects damping of heat shield segments 70. The combined structure illustrated in FIG. 4 provides heat shield segments 70 for a heat shield extending circumferentially about torque tube 10 which provides effective heat shielding and damping of the heat shield, with the heat shield segments easily manufactured and assembled and retained in place by spline caps 20.

I claim:

1. In an aircraft brake having rotatable discs connected with a wheel and stationary discs connected with a torque tube, the stationary discs having at an inner diameter thereof a plurality of circumferentially spaced-apart complementary shaped axial openings which receive respectively axially extending splines of a torque tube, the axially extending splines each having a pair of substantially radially extending circumferentially spaced-apart walls extending along the axial length of the spline and connected by a circumferentially extending radially outer surface of the spline, metal cover each extending axially and disposed over a respective spline so that the metal cover is located within the respective complementary shaped axial openings of the stationary discs, a heat shield segment located circumferentially between each of the splines wherein each segment comprises a radially outer member spaced radially apart from a radially inner member to define a cavity therebetween, the radially outer and radially inner members meeting to define circumferentially spaced-apart ends, each end extending into engagement with an adjacent metal cover such that the adjacent metal cover retains radially the end, and a vibration dampening mesh material located within each cavity.

2. The aircraft brake in accordance with claim 1, further comprising a vibration dampening mesh material located adjacent each of the spaced-apart walls so that the mesh material is located between the respective spline and metal cover which is located within the complementary shaped axial openings of the stationary discs.

3. In an aircraft brake having rotatable discs connected with a wheel and stationary discs connected with a torque tube, the stationary discs having at an inner diameter thereof a plurality of circumferentially spaced-apart complementary shaped axial openings which receive respectively axially extending splines of the torque tube, the axially extending splines each having a pair of substantially radially extending circumferentially spaced-apart walls extending along the axial length of the spline and connected by a circumferentially extending radially outer surface of the spline, a vibration dampening mesh material located adjacent each of the spaced-apart walls, and metal covers each extending axially and disposed over a respective spline so that the mesh material is located between the respective spline and metal cover which is located within the respective complementary shaped axial openings of the stationary discs, each said metal cover comprising a jacket disposed over a respective spline with circumferential sides extending circumferentially away from the respective spaced-apart walls of the spline and the circumferential sides each engaging an adjacent circumferential side, so that during operation of said brake the mesh material effects a dampening of vibrations generated during braking operation.

4. The aircraft brake in accordance with claim 3, wherein each circumferential side abuts an adjacent circumferential side.

5. The aircraft brake in accordance with claim 3, wherein the jackets comprise heat shield segments.

6. In an aircraft brake having rotatable discs connected with a wheel and stationary discs connected with a torque tube, the stationary discs having at an inner diameter thereof a plurality of circumferentially spaced-apart complementary shaped axial openings which receive respectively axially extending splines of the torque tube, the axially extending splines each having a pair of substantially radially extending circumferentially spaced-apart walls extending along the axial length of the spline and connected by a circumferentially extending radially outer surface of the spline, a vibration dampening mesh material located adjacent each of the spaced-apart walls, and metal covers each extending axially and disposed over a respective spline so that the mesh material is located between the respective spline and metal cover which is located within the respective complementary shaped axial openings of the stationary discs, the mesh material able to transmit braking torque loads from the metal covers to the splines, so that during operation of said brake the mesh material effects a dampening of vibrations generated during braking operation.

7. The aircraft brake in accordance with claim 6, wherein the mesh material comprises a pair of axially extending mesh strips disposed substantially parallel to one another and each engaging substantially most of a respective spaced-apart wall of the respective spline.

8. The aircraft brake in accordance with claim 6, wherein the mesh material comprises a mesh cover which extends over the outer surface and spaced-apart walls of each spline and extends circumferentially toward an adjacent spline.

9. The aircraft brake in accordance with claim 8, wherein the mesh material comprises a single piece of mesh material which extends circumferentially around the exterior of said torque tube.

10. The aircraft brake in accordance with claim 6, wherein the discs are carbon-carbon composite discs.

11. The aircraft brake in accordance with claim 10, wherein the mesh material dampens vibrations in a range extending up to approximately 8-9 kHz.

12. The aircraft brake in accordance with claim 6, wherein the mesh material comprises a stainless steel wire mesh.

* * * * *